2,874,051
METHOD OF MAKING A CULINARY MIX AND THE RESULTING PRODUCT

William T. Bedenk, Greenhills, and John W. Phenix, Wyoming, Ohio, assignors to The Procter & Gamble Company, Cincinnati, Ohio, a corporation of Ohio No Drawing. Application June 8, 1956
Serial No. 590,100

13 Claims. (Cl. 99—94)

This invention relates to methods for making culinary mixes. More particularly, it relates to the preparation of mixes comprising flour, sugar, shortening, and chemical leavening agents, and which are suitable for use in preparing baked goods.

The use of so-called "prepared mixes" for baked goods has achieved wide usage, particularly in the home. In mixes of this type, dry ingredients are combined in proper proportions and the mixes are then packaged. Liquid materials, such as water, milk, and/or eggs, are added to the mix to prepare a batter for use in baking. By utilization of these mixes, one of the problems in baking, variation in ingredients, has been eliminated to a large degree.

In the co-pending application of Mills, U. S. Serial No. 521,416, now abandoned, there is disclosed a method of preparing culinary mixes in which flour, sugar, and shortening are thoroughly mixed together and the resulting mixture is subjected to simultaneous shearing and crushing forces. Additional components of the culinary mix, which may be added either before or after the shearing and crushing forces have been applied, include egg solids, salt, milk powder, and flavoring. As was further disclosed in the application, a much shorter agitation time can be used in the preparation of batters from such mixes than is required for prior art mixes without adversely affecting the resulting baked products.

It has been found that if the chemical leavening agents are combined with the other ingredients of such a mix prior to the shearing and crushing step, subsequent aging of the mix will cause a reduction in volume of cakes baked from batters made from the mix. It has now been found that the amount of this reduction in volume of cakes baked from aged mixes is substantially decreased if the leavening agents are added after the shearing and crushing forces are applied to the mix.

Accordingly, it is one of the objects of this invention to provide a culinary mix which will produce satisfactory cakes even after the mix has aged, and to provide a method for making such a mix.

Other objects and advantageous features will be apparent from the following detailed description.

In general, this invention comprises thoroughly mixing together flour, sugar, and shortening, and then subjecting this mixture to simultaneous shearing and crushing forces. Subsequent to the shearing and crushing step, chemical leavening agents are added to the mixture.

Chemical leavening agents are used in batters for the purpose of forming gases during baking so that a light, large-volume product can be made. Commonly used chemical leavening agents comprise an alkaline material, usually sodium bicarbonate, and an acid material which will react with the alkaline material to form a gas (usually carbon dioxide). Suitable acid materials include potassium acid tartrate (cream of tartar), monocalcium phosphate, monosodium phosphate, sodium acid pyrophosphate, sodium aluminum sulfate, and combinations of these. However, this invention is not to be limited to the use of these specific chemical leavening agents but is intended to include any other chemical leavening agents suitable for this purpose.

The initial step in practicing the purpose of this invention is a thorough pre-mixing of the sugar, flour, and shortening. Other components of the mixes, which can be added either during the pre-mixing or after the shearing and crushing step, include egg solids, salt, milk powder, and flavoring. Except as stated hereinafter, the order in which the ingredients are combined is not a critical factor in the performance of the mix. The amounts of the ingredients may vary widely as will hereinafter be set forth.

Various types of mixing means may be used for this pre-mixing step, such as ribbon blenders and conventional dough mixers, so long as they provide for an adequate dispersion of the fat and the formation of a homogeneous mixture. It may be desirable to further break up any particles in the mixture by passing it through an impacting device. One of such devices is disclosed in U. S. Patent No. 2,339,737 issued January 18, 1944. This device comprises two parallel horizontal discs spaced apart by interconnecting pins extending at right angles to the surface of the discs. An external shell encloses the device. Material to be broken up is passed through a hole in the center of the top disc while the discs are revolving at a high rate of speed. Centrifugal forces impact the feed material against the pins and the external shell. The broken-up material passes out through an outlet at the bottom of the device. Other devices suitable for this purpose and known in the art may be used.

As the next step in the process of this invention, the thoroughly mixed material is then passed through some means which will simultaneously apply a shearing and crushing force to the mixture. The purpose of such means is to crush the sugar crystals and to bond a significant portion of these crushed crystals to the flour. This step also tends to embed the sugar fragments in the flour. The shortening is distributed throughout the mix, forming a thin film throughout the sugar and flour, and coating the sugar-flour particles.

Very good results may be obtained in the shearing and crushing step by use of roller mills in which the adjacent rollers revolve at different speeds. For best results, the ratios of roll speeds of adjacent rolls need not exceed 5:1. The milling may be done by a single pass or by several passes. However, a large number of passes between rollers may prove economically unsound.

Optimum operating temperatures range from 70° to 110° F., and it may be desirable to cool or heat the rollers to maintain such temperatures.

A convenient measure of the milling conditions can be made by ascertaining the work input to the mix. Although the optimum value will be set by the efficiency of equipment, a total work input of 5 to 70 watt-hours/lb. will provide a satisfactory cake mix. Less work may be necessary if the sugar was initially in the form of extremely small particles.

At the conclusion of the shearing and crushing step, chemical leavening agents are added. For best results, substantially all of the particles of leavening agents should range from $80\mu$ to $150\mu$ in diameter. Any other materials of the mix which have not been previously added may also be added at this time. These additional ingredients are blended in by means such as a ribbon blender, dough mixer, cutflite conveyor, or other effective mixing device. The mixing should be continued until all ingredients are adequately dispersed.

If any flakes remain from the shearing and crushing step, it may be desirable, as a final step, to subject the mix to means which will completely break up these flakes. Apparatus such as the impact device previously described will accomplish this in a very satisfactory manner.

The process of this invention is applicable to a wide variety of mixes, and is not limited except by the desired eating qualities and appearance.

Mixes suitable for preparing many types of cakes can be produced by the process of this invention, including, but not limited to, white, chocolate, yellow, and spice. Preferred ranges of cake ingredients are as follows:

|  | Percent |
|---|---|
| Sugar | 38-48 |
| Flour | 28-45 |
| Shortening | 9-16 |
| Leavening agents | 1-4 |
| Salt | 0.5-1.5 |
| Cocoa | 0-7 |
| Egg solids | 0-5 |
| Non-fat dry milk solids | 0-5 |
| Flavoring (including spices) | Minor amounts |
| Coloring | Minor amounts |

In general, the types and qualities of the above materials are those which could be used in mixes of the prior art. For example, the shortening may include any conventional animal or vegetable shortening which may vary in plasticity from very firm to very soft. Emulsifiers of the commonly used types may also be present in the shortening in suitable amounts and proportions.

The practice of this invention will provide an especially good cake mix when the ratio of sugar to flour is greater than 1:1. The shortening used in this type of mix should contain suitable emulsifiers, such as partially esterified polyhydric compounds having surface active properties. These include, but are not limited to, mono- and diglycerides of fatty acids, fatty acid partial esters of sucrose, phosphoric and sulfuric acid esters of polyhydric compounds. A number of suitable emulsifying agents may be found disclosed in U. S. Patent No. 2,024,357, Harris, issued December 17, 1935.

In the preparation of culinary mixes for making cakes, the flour normally should be bleached cake flour. If suitable emulsifiers are used and the egg and liquid content are properly adjusted, a general purpose flour will give good results.

Suitable sugars include any of the commonly used sugars, such as sucrose, dextrose, fructose, and levulose. Prior to the preliminary mixing step, the sugar may be reduced to granulated or powder form.

The optimum amounts of leavening agents to be used in mixes of this invention will depend upon the particular leavening agents used and upon the other ingredients of the mix. However, it is desirable that no excessive amount of sodium bicarbonate be used, since an excess of sodium bicarbonate may cause a yellow color and a disagreeable alkaline flavor in the baked products.

One of the most commonly used tests for evaluating cakes is the measurement of volume in cubic centimeters per pound. Example I shows the superiority of cakes baked from mixes in which the leavening agents were added after the shearing and crushing step as compared to mixes in which the leavening agents were added in the initial mixing step. These comparisons show the differences in the cakes when the mixes were aged for the specified periods of time prior to being made into batters and baked.

It has been found that yellow cakes show a pronounced change in quality and physical appearance when variations are made in the ingredients or in the processing of mixes for cakes. For this reason, cake mixes having the following compositions were used:

EXAMPLE I

| Ingredients | Yellow—low fat mix | Yellow—high fat mix |
|---|---|---|
|  | Percent | Percent |
| Sugar | 45.5 | 42.33 |
| Flour | 39.5 | 40.00 |
| Shortening | 10.0 | 14.00 |
| Non-fat milk solids | 2.5 | 1.40 |
| Sodium bicarbonate | 0.7 | 0.60 |
| Monocalcium pyrophosphate | 0.5 | 0.44 |
| Sodium acid pyrophosphate | 0.6 |  |
| Sodium aluminum sulfate |  | 0.23 |
| Salt | 0.7 | 1.00 |

Each of the mixes was prepared by creaming together sugar and shortening in a 100 lb. capacity horizontal ribbon blender until a homogeneous blend was formed. The flour, milk solids, and salt were then added. (If leavening agents were added prior to milling, they were added at this time). Mixing was continued until the mixture was homogeneous and in the form of dry, relatively free-flowing particles. The mixture was then passed twice through a three-roll roller mill in which the ratios of speeds of the rollers were 1:2:4. After the second pass through the mill the leavening agents were added to the mix to which they had not been added prior to milling. The mixtures were then mixed again in a horizontal ribbon blender and put through an impact device of the type previously described.

The high and low fat mixes, with leavening added before and after milling, were then divided into paired portions which were used in making cakes for volume comparison after 0, 2, and 5 weeks' aging. The percentage change noted in volumes are indicated in the table below, the minus signs indicating a decrease.

*Yellow—low fat cakes*

| Type mix | Fresh mix (volume) (cc./lb.) | Aged 2 wks. (percent change) | Aged 5 wks. (percent change) | Accelerated aging [1] (percent change) |
|---|---|---|---|---|
| Entire mix milled | 1,680 | -3.0 | -18.5 |  |
| Mix milled and leavening added after milling | 1,685 | -2.7 | -12.5 |  |
| Entire mix milled | 1,755 |  |  | -54.5 |
| Mix milled and leavening added after milling | 1,675 |  |  | -26.6 |

*Yellow—high fat cakes*

| Type mix | Fresh mix (volume) (cc./lb.) | Aged 2 wks. (percent change) | Aged 5 wks. (percent change) |
|---|---|---|---|
| Entire mix milled | 1,350 | -3.95 | -10.4 |
| Mix milled and leavening added after milling | 1,445 | -0.71 | -8.3 |

[1] This aging was done by placing the mix in glassine bags and holding at 80% relative humidity, 90° F. for nine days. This is equivalent to at least a year of normal aging on a shelf.

In each instance, batters were prepared by adding two thirds cup of water to 20 oz. of mix and beating for two minutes with an electric household mixer operating at medium speed. Two eggs and one-third cup of water were added, and the batter was beaten for two additional minutes. The batter was placed in the cake pans and baked at 350° F.

The same superior mix performance after aging will be found in other mixes prepared by the process of this invention.

Under proper shearing and crushing conditions, a substantial part of the sugar crystals are fragmented. The leavening agent is present in the mix in the form of discrete finely divided particles which are substantially unbonded to flour particles and substantially uncoated with shortening.

The bonding of the sugar and flour and the uniform density of the bonded sugar and flour can be clearly shown by sedimentation tests. The fat is extracted from the mix by hot hexane, and then equal amounts of the mix are added to benzene-carbon tetrachloride liquid mixtures having various densities. By measuring the amounts of fat-free mix which float and sink in the liquid mixtures of various densities, it has been found that not more than 10% of any fat-free mix of this invention will have a density greater than 1.59, and not more than about 29% will have a density less than 1.50. For convenience, densities measured in this manner will hereinafter be referred to as sedimentation densities. As a comparison, when sugar and flour mixtures, in which the sugar and flour are not bonded, are tested in the same manner, it will be found that the sugar and flour separate, and all sugar will have a density greater than 1.59, while substantially all of the flour will have a density less than 1.47.

While specific apparatus has been described in the disclosure of this invention, it is to be understood that the invention is not to be limited to the use of any particular device.

What is claimed is:

1. The method of making a culinary mix which comprises the steps of forming a homogeneous mixture comprising sugar, flour, and shortening, then subjecting said homogeneous mixture to simultaneous shearing and crushing forces, and thereafter adding a chemical leavening agent to said mixture, whereby a pulverulent and free-flowing mix is obtained in which a substantial portion of the crystals of said sugar are fragmented and mechanically bonded to particles of said flour, in which said shortening is dispersed substantially in a thin film throughout said mix and coating said bonded sugar and flour, and in which said leavening agent is in the form of discrete particles substantially unbonded to said flour particles and substantially uncoated with shortening.

2. The method according to claim 1, wherein the leavening agent comprises sodium bicarbonate and at least one acid material selected from the group consisting of potassium acid tartrate, monocalcium phosphate, monosodium phosphate, sodium acid pyrophosphate, and sodium aluminum sulfate.

3. The method of making a culinary mix which comprises the steps of forming a homogeneous mixture comprising sugar, flour, and shortening, then passing said homogeneous mixture between two rollers moving at different speeds, said rollers being spaced so as to exert simultaneous shearing and crushing forces on said mixture, and thereafter adding a chemical leavening agent to said mixture, whereby a pulverulent and free-flowing mix is obtained in which a substantial portion of the crystals of said sugar are fragmented and mechanically bonded to particles of said flour, in which said shortening is dispersed substantially in a thin film throughout said mix and coating said bonded sugar and flour, and in which said leavening agent is in the form of discrete particles substantially unbonded to said flour particles and substantially uncoated with shortening.

4. The method according to claim 3, wherein the leavening agent comprises sodium bicarbonate and at least one acid material selected from the group consisting of potassium acid tartrate, monocalcium phosphate, monosodium phosphate, sodium acid pyrophosphate, and sodium aluminum sulfate.

5. The method of making a culinary mix which comprises the steps of forming a homogeneous mixture comprising from 38 to 48 parts of sugar, from 28 to 45 parts of flour, from 9 to 16 parts of shortening, from 0 to 5 parts of egg solids, and from 0 to 5 parts of dry milk solids, then subjecting said homogeneous mixture to simultaneous shearing and crushing forces, and thereafter adding from 1 to 4 parts of a chemical leavening agent to said mixture, whereby a pulverulent and free-flowing mix is obtained in which a substantial portion of the crystals of said sugar are fragmented and mechanically bonded to particles of said flour, in which said shortening is dispersed substantially in a thin film throughout said mix and coating said bonded sugar and flour, and in which said leavening agent is in the form of discrete particles substantially unbonded to said flour particles and substantially uncoated with shortening.

6. The method according to claim 5, wherein the chemical leavening agent comprises sodium bicarbonate and at least one acid selected from the group consisting of potassium acid tartrate, monocalcium phosphate, monosodium phosphate, sodium acid pyrophosphate, and sodium aluminum sulfate.

7. The method of making a culinary mix which comprises the steps of forming a homogeneous mixture comprising from 38 to 48 parts of sugar, from 28 to 45 parts of flour, from 9 to 16 parts of shortening, from 0 to 5 parts of egg solids, and from 0 to 5 parts of dry milk solids, then passing said homogeneous mixture between two rollers moving at different speeds, said rollers being spaced so as to exert simultaneous shearing and crushing forces on said mixture, and thereafter adding a chemical leavening agent to said mixture, whereby a pulverulent and free-flowing mix is obtained in which a substantial portion of the crystals of said sugar are fragmented and mechanically bonded to particles of said fluor, in which said shortening is dispersed substantially in a thin film throughout said mix and coating said bonded sugar and flour, and in which said leavening agent is in the form of discrete particles substantially unbonded to said flour particles and substantially uncoated with shortening.

8. The method according to claim 7, wherein the chemical leavening agent comprises sodium bicarbonate and at least one acid material selected from the group consisting of potassium acid tartrate, monocalcium phosphate, monosodium phosphate, sodium acid pyrophosphate, and sodium aluminum sulfate.

9. A culinary mix suitable for the preparation of baked goods, said mix comprising crystalline sugar, flour, and shortening, a substantial portion of the crystals of said sugar being fragmented and mechanically bonded to particles of said flour, said shortening being substantially dispersed in a thin film throughout said mix and coating said bonded sugar and flour, and said mix containing additionally discrete particles of a chemical leavening agent substantially unbonded to flour particles and substantially uncoated with shortening.

10. A culinary mix suitable for the preparation of baked goods, said mix comprising crystalline sugar, flour, shortening, and a chemical leavening agent, a substantial portion of the crystals of said sugar being fragmented and mechanically bonded to particles of said flour, said shortening being substantially dispersed in a thin film throughout said mix and coating said bonded sugar and flour, and said chemical leavening agent being present in said mix in the form of finely divided particles, substantially all of said particles of leavening agent having a diameter of from $80\mu$ to $150\mu$ and being substantially unbonded to flour particles and substantially uncoated with shortening.

11. A culinary mix comprising crystalline sugar, flour, shortening, and a chemical leavening agent, a substantial portion of the crystals of said sugar being fragmented and mechanically bonded to particles of said flour, said shortening being substantially dispersed throughout and coating said bonded sugar and flour, and said leavening agent being present in said mix in the form of finely divided particles, substantially all of said particles of leavening agent having a diameter of from $80\mu$ to $150\mu$ and being substantially unbonded to flour particles and substantially uncoated with shortening, not more than 10% of said mix having a sedimentation density greater than 1.59 and not more than 29% of said mix having a sedimentation density less than 1.50.

12. A culinary mix according to claim 11, comprising from 38 to 48 parts of sugar, from 28 to 45 parts of flour, from 9 to 16 parts of shortening, from 0 to 5 parts of egg solids, from 0 to 5 parts of dry milk solids, and from 1 to 4 parts of a chemical leavening agent.

13. A culinary mix according to claim 12, wherein the chemical leavening agent comprises sodium bicarbonate and at least one acid selected from the group consisting of potassium acid tartrate, monocalcium phosphate, monosodium phosphate, sodium acid pyrophosphate, and sodium aluminum sulfate.

References Cited in the file of this patent

UNITED STATES PATENTS

| | | |
|---|---|---|
| 269,743 | Thorpe | Dec. 26, 1882 |
| 827,936 | Obermaier | Aug. 7, 1906 |
| 1,700,510 | Oches | Jan. 29, 1929 |
| 2,172,211 | Lloyd | Sept. 5, 1939 |
| 2,555,902 | Salo et al. | June 5, 1951 |

OTHER REFERENCES

U. S. D. A. Circular No. 138, Febuary 1931, page 1.